United States Patent
Zaffino

(10) Patent No.: US 9,095,892 B2
(45) Date of Patent: Aug. 4, 2015

(54) MOULD WITH CONFORMAL COOLING

(71) Applicant: Ariel Andre Waitzman, Franklin, MI (US)

(72) Inventor: Pascal Zaffino, Windsor (CA)

(73) Assignee: Ariel Andre Waitzman, Franklin, MI (US)

( * ) Notice: Subject to any disclaimer, the term of this patent is extended or adjusted under 35 U.S.C. 154(b) by 34 days.

(21) Appl. No.: 13/958,002

(22) Filed: Aug. 2, 2013

(65) Prior Publication Data

US 2013/0319976 A1 Dec. 5, 2013

Related U.S. Application Data

(63) Continuation of application No. 12/870,017, filed on Aug. 27, 2010, now Pat. No. 8,517,248.

(60) Provisional application No. 61/251,498, filed on Oct. 14, 2009.

(51) Int. Cl.
| | |
|---|---|
| *B23K 20/00* | (2006.01) |
| *B23K 31/02* | (2006.01) |
| *B22C 9/00* | (2006.01) |
| *B23K 9/04* | (2006.01) |
| *B23K 33/00* | (2006.01) |
| *B23K 10/02* | (2006.01) |
| *B23K 26/34* | (2014.01) |
| *B22D 17/22* | (2006.01) |
| *B29C 45/73* | (2006.01) |

(52) U.S. Cl.
CPC .............. *B22C 9/00* (2013.01); *B22D 17/2218* (2013.01); *B23K 9/04* (2013.01); *B23K 10/027* (2013.01); *B23K 26/345* (2013.01); *B23K 33/004* (2013.01); *B29C 45/7312* (2013.01); *Y10T 29/49* (2015.01)

(58) Field of Classification Search
CPC .. B23K 26/345; B23K 33/004; B23K 10/027; B23K 9/04
USPC ............... 164/128, 144, 443, 444; 228/141.1, 228/203, 13
See application file for complete search history.

(56) References Cited

U.S. PATENT DOCUMENTS

| | | | |
|---|---|---|---|
| 4,621,185 A * | 11/1986 | Brown ..................... | 219/124.34 |
| 2005/0072386 A1* | 4/2005 | Gabriel et al. ............. | 123/41.35 |
| 2006/0099295 A1* | 5/2006 | Elliott ........................ | 425/564 |

FOREIGN PATENT DOCUMENTS

| | | | |
|---|---|---|---|
| DE | 19623148 A1 * | 1/1998 | |
| JP | 60152371 A * | 8/1985 | |

OTHER PUBLICATIONS

DE19623148 A1 computer english translation.*

* cited by examiner

*Primary Examiner* — Erin Saad
(74) *Attorney, Agent, or Firm* — Carlson, Gaskey & Olds, P.C.

(57) ABSTRACT

A method of providing a mold with a conformal cooling passage includes rough machining a mold cavity generally corresponding to a molded part shape using CAD data. Conformal cooling slots are cut in the mold cavity using the CAD data. The conformal cooling slots are welded shut using the CAD data to provide conformal cooling passages. A class A surface is machined over the conformal cooling passage and corresponds to a finished mold part shape using the CAD data.

40 Claims, 3 Drawing Sheets

MOULD WITH CONFORMAL COOLING

RELATED APPLICATIONS

This application is a continuation of prior U.S. patent application Ser. No. 12/870,017, filed on Aug. 27, 2010, which claims the benefit of U.S. Provisional Application No. 61/251,498, filed on Oct. 14, 2009.

BACKGROUND

This disclosure relates to moulds having conformal cooling and a method for providing the same.

Moulds, such as those used in plastic injection moulding, are subject to significant heat during the injection moulding process. The moulds are cooled during injection moulding to cool the plastic part and improve cycle times.

Over the years conformal cooling has been used to improve mould cooling by providing more uniform cooling of the part. A conformal cooling approach provides cooling passages that generally conform to or follow the contour of the moulded part beneath the finished mould surface. Since the finished mould surface is of a generally complex shape, it is difficult to provide conformal cooling passages in the desired location. Typically, intersecting passages are gun-drilled into the mould, and then plugged at various locations, to provide the conformal cooling passages. Providing conformal cooling passages in this manner is undesirable due to the large expense, the difficulty in gun-drilling large moulds (such as those used for vehicle bumpers), and the poor approximation of the conformal cooling passages to the finished mould surface.

SUMMARY

A mould with conformal mould cooling passage includes a mould with a cut conformal cooling slot having a surface. Weld beads laid on the surface enclose the cut conformal cooling slot with a metal filler adjoining the cut conformal cooling slot to provide an enclosed conformal cooling passage. A class A machined surface is provided across the weld beads and the mould adjoining the cut conformal cooling slot.

A method of providing a mould with a conformal cooling passage includes rough machining a mould cavity generally corresponding to a moulded part shape using CAD data. Conformal cooling slots are cut in the mould cavity using the CAD data. The conformal cooling slots are welded shut using the CAD data to provide conformal cooling passages. A class A surface is machined over the conformal cooling passage and corresponds to a finished mould part shape using the CAD data.

DETAILED DESCRIPTION

Figure 1A:
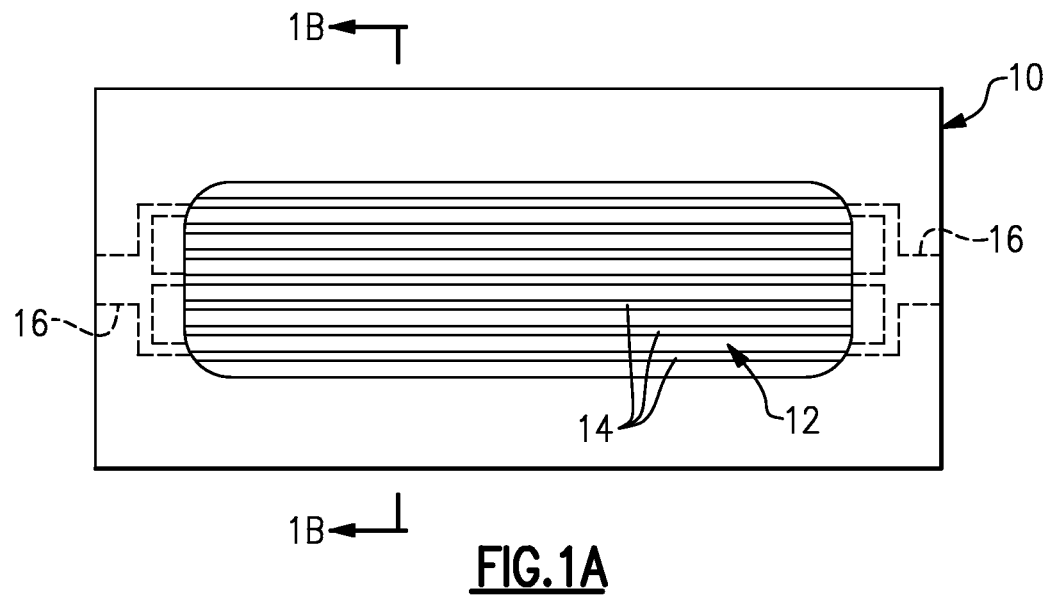
FIG. 1A is a top elevational view of mould with rough mould cavity and cut conformal cooling slots.
Figure 1B:
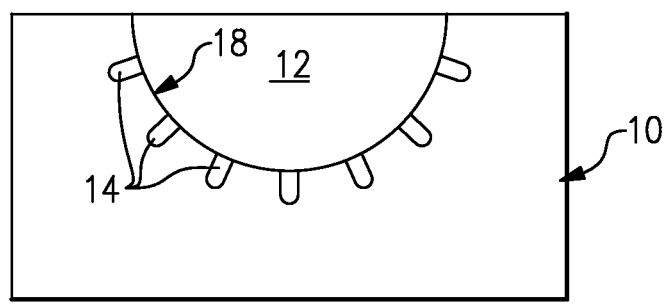
FIG. 1B is a cross-sectional view of the mould in FIG. 1A taken along line 1A-1A.

A mould 10 is shown in FIGS. 1A and 1B that is suitable, for example, for injection moulding. The mould 10 was provided as a blank and machined to provide a rough mould cavity 12 having a rough contoured surface 18 generally corresponding to a shape of a part to be moulded, for example, a vehicle bumper. Cut conformal cooling slots 14 are machined into the rough contoured surface 18 at a first depth 25 of 1.5-2.5 inches, for example. Other fluid passages 16 may be machined to intersect the cut conformal cooling slots 14 to communicate fluid from a cooling fluid source.

Figure 2:
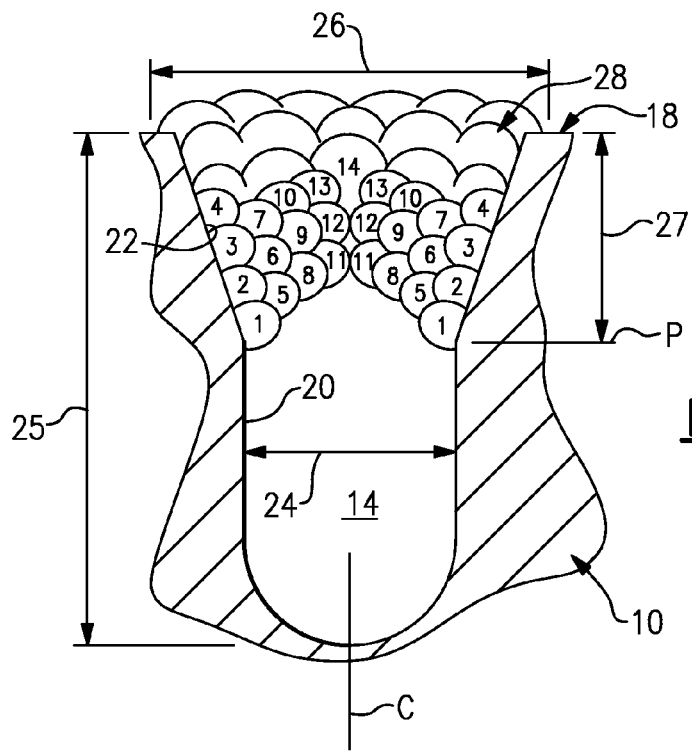
FIG. 2 is a cross-sectional view of a cut conformal cooling slot with weld beads.

An example cut conformal cooling slots 14 is shown in more detail in FIG. 2. The cut conformal cooling slot 14 provides spaced apart lateral walls 20, providing a first width 24, that are generally parallel with one another in the example shown. Spaced apart angled walls 22 adjoin the lateral walls 20 and taper generally away from one another to provide a second width 26 where the angled walls 22 meet the rough contoured surface 18. In one example, the first width 24 is approximately 0.5 inch, and the second width 26 is approximately 0.75 inch at the rough contoured surface 18. The lateral and angled walls 20, 22 may be provided by a single cutting tool.

The angled walls 22 are provided at an angle of approximately 10-20° relative to the lateral wall to provide a surface for welding. The cut conformal cooling slot 14 includes a centerline C, and the angled walls 22 are provided at an angle relative to the centerline C. During welding, the angled walls 22 are arranged at an obtuse angle relative to a true horizontal plane P to reduce the undesired effects of gravity on the weld bead as it transitions from the molten state to solid metal. Weld beads 28 are laid on the angle walls 22 starting at a second depth 27 of approximately 0.5-0.75 inch below the rough contoured surface 18. The weld beads 28 are built up on top of one another, for example, in the number sequence indicated in FIG. 2, until the weld beads are proud of the rough contoured surface. The weld beads 28 are robotically TIG welded onto the mould 10 according to U.S. application Ser. No. 11/924,649, filed Oct. 27, 2007, which is incorporated by reference.

Figure 3:
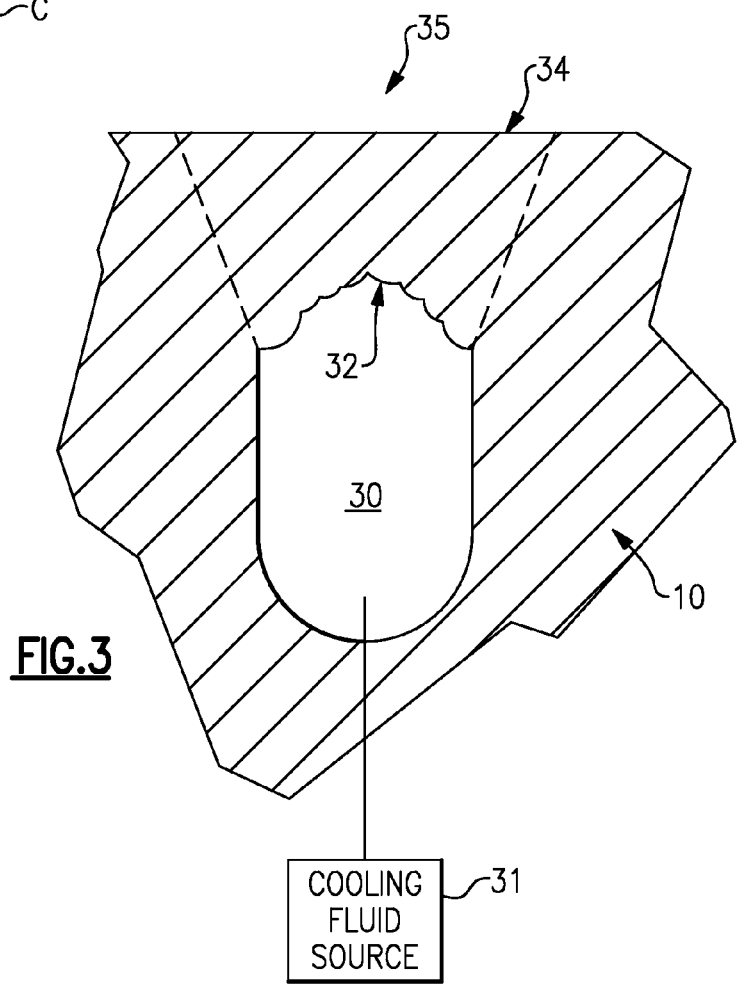
FIG. 3 is a cross-sectional view of an enclosed conformal cooling slot with an adjacent machined surface.

Referring to FIG. 3, the weld beads 28 provide a welded surface 32 of metal filler that, together with the cut conformal cooling slot 14, provides an enclosed conformal cooling passage 30. The finished conformal cooling passage 30 corresponds to a passage diameter of, for example, between ⅜ and ¾ inch. During use, the conformal cooling passages are fluidly connected to a cooling fluid source 31. Dashed lines indicate the previously present angled walls. The weld beads 28 and rough contoured surface 18 are machined to provide a class A machined surface 34 that corresponds to the finished moulded part shape.

Figure 4:
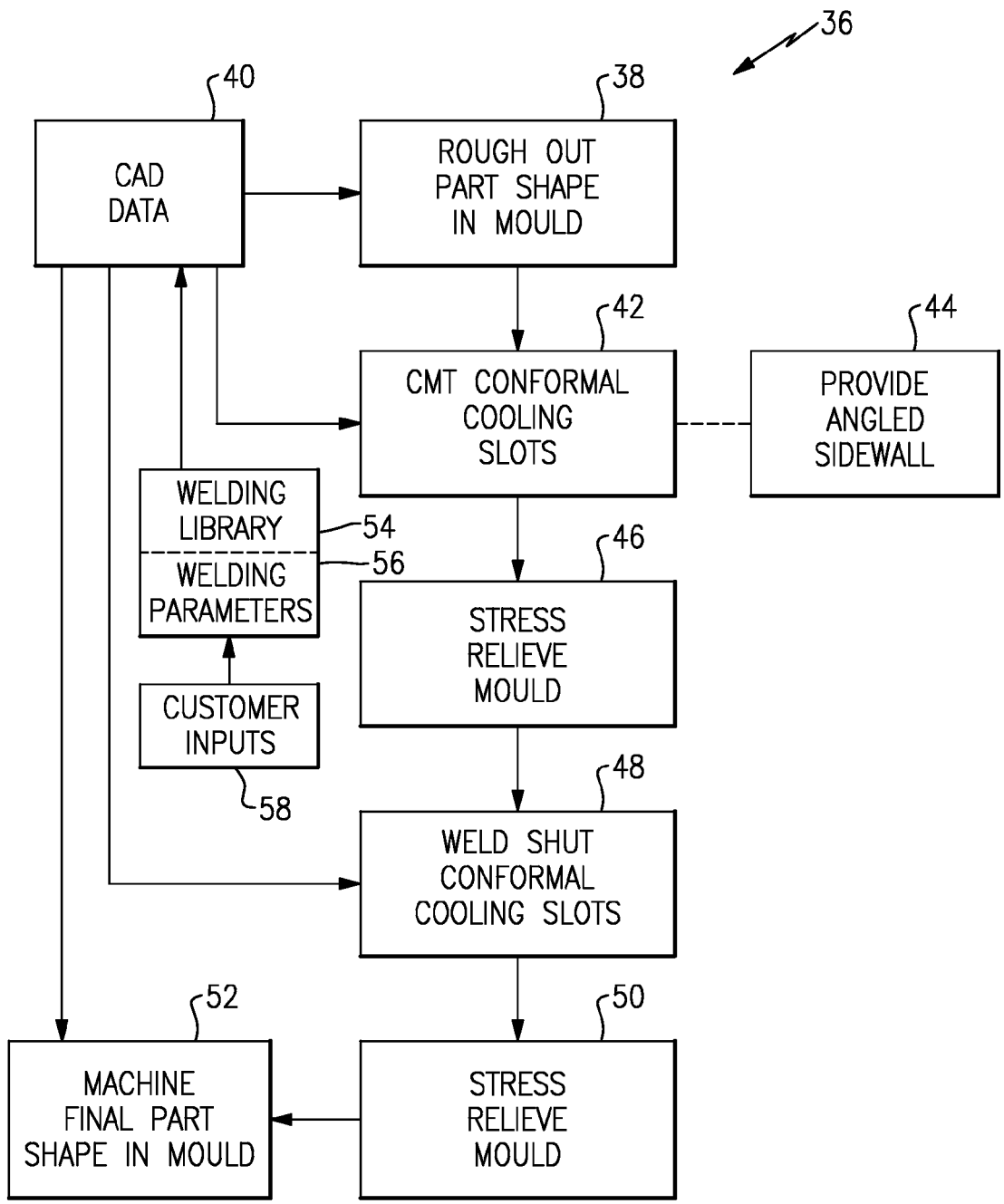
FIG. 4 is flowchart depicting a mould manufacturing method.

A mould manufacturing method 36 is schematically illustrated in FIG. 4. At least portions of the manufacturing method are provided by a controller (not shown), which may include hardware and/or software and temporary and/or permanent memory, for example, CAD data, robotic control algorithms and other information. CAD data 40 is used to rough out the part shape in the mould 10 to provide the rough mould cavity 12, as indicated at block 38. The cut conformal cooling slots 14 are machined, as indicated at block 42, in desired locations using the CAD data 40. Angled walls 22 are provided in cut conformal cooling slots 44 providing the welding torch adequate access, as indicated in block 44. The mould 10 is heated to provide stress relief, as indicated at block 46.

As indicated at block 48, weld beads 28 are robotically TIG welded onto the angled walls 22 using the CAD data 40 to create enclosed conformal cooling passages 30. The controller includes a welding library 54 in one example, which includes various welding parameters 56. The welding parameters may include, for example, travel speed of the welding torch, feed rate of the wire and welding current. The welding parameters are organized into sets of welding preferences associated with a conformal cooling passage size. For example, a ⅜ inch diameter cooling passage may include welding preferences of approximately 0.5 lb./hour wire feed rate a relatively low amperage and low welding torch speed. By way of contrast, a conformal cooling passage of approximately ¾ inch diameter may include welding preferences of 1.5 lb./hour wire feed rate and higher amperages and welding tip travel speed than that of a ⅜ inch conformal cooling passage. Thus, the welding step includes selecting from the predetermined set of welding preferences based upon the conformal cooling passage size. The available access for the welding torch may also affect the welding preferences.

The welding preferences are intended to accommodate all tool steels. The customer is permitted to provide a customer input 58 to vary some of the welding preferences by a predetermined amount. For example, customers may be permitted to vary the weld torch travel speed, wire feed rate and amperage by up to 10% to accommodate the customer's preferences and variations between different tool steels, for example.

The mould 10 is stress relieved after welding, as indicated at block 50. The weld beads 28 and rough contoured surface 18 are machined using CAD data 40 to provide a class A machined surface 34 corresponding to a finished part shape, as indicated in block 52.

Although an example embodiment has been disclosed, a worker of ordinary skill in this art would recognize that certain modifications would come within the scope of the claims. For example, although a vehicle bumper has been disclosed as an example moulded part, moulds for other large parts can benefit from the disclosed mould and method. For that reason, the following claims should be studied to determine their true scope and content.

What is claimed is:

1. A method of providing a mould with a conformal cooling passage comprising:
    cutting conformal cooling slots into a mould cavity;
    heating the mould after cutting the conformal cooling slots to relieve stress from the mould;
    welding shut the conformal cooling slots with a first number of weld beads that span the conformal cooling slots to provide conformal cooling passages;
    laying additional weld beads on the first number of weld beads until the additional weld beads are proud of an adjacent surface of the mould; and
    machining a surface over the conformal cooling passage corresponding to a finished mould part shape.

2. The method according to claim 1, heating the mould after welding shut the conformal cooling slots to relieve stress from the mould.

3. The method according to claim 1, wherein the mould cavity is rough machined before cutting the conformal cooling slots, and wherein the mould cavity generally corresponds to a moulded part shape.

4. The method according to claim 1, wherein the cut conformal cooling slots each include an angled surface, the angled surfaces being angled relative to a centerline of a respective one of the cut conformal cooling slots, the welding step including laying weld beads on the angled surfaces.

5. The method according to claim 4, wherein each angled surface is arranged at an obtuse angle relative to a true horizontal plane.

6. The method according to claim 4, wherein each of the cut conformal cooling slots includes a first depth and a second depth less than the first depth, the second depth including the angled surface and the first depth including walls generally parallel to one another.

7. The method according to claim 6, wherein the first depth is between approximately 1.5-2.5 inches.

8. The method according to claim 6, wherein the cut conformal cooling slot includes first and second widths, the second width greater than the first width, the second width including the angled surface and the first width including the walls.

9. The method according to claim 8, wherein the first width is between 0.125 and 0.75 inches.

10. The method according to claim 6, including providing a welding library including welding parameters organized in welding preferences corresponding to various conformal cooling passage sizes, selecting a set of welding preferences based upon the cut conformal cooling slot, and welding shut the cut conformal cooling slot using the selected welding preferences.

11. The method according to claim 10, wherein each cut conformal cooling slot includes first and second widths, the second width greater than the first width, the second width including the angled surface and the first width including the walls, and wherein the welding preferences are selected based upon the second width.

12. The method according to claim 10, including providing customer input to vary the welding preferences.

13. The method according to claim 10, wherein the welding parameters and welding preferences include welding torch travel speed, wire feed rate and welding amperage.

14. A method of providing a mould with a conformal cooling passage comprising:
    heating a mould to relieve stress from the mould, the mould including a conformal cooling slot;
    welding shut the conformal cooling slot to provide a conformal cooling passage, wherein the conformal cooling slot is welded shut with a first number of weld beads spanning a width of the conformal cooling slot; and
    heating the mould after welding shut the conformal cooling slot to relieve stress from the mould; and
    after the first number of weld beads are laid and span the width of the conformal cooling slot, additional weld beads are built up on top of the first number of weld beads until the additional weld beads are proud of an adjacent surface of the mould.

15. The method according to claim 14, including machining a surface over the conformal cooling passage corresponding to a finished mould part shape.

16. A method for forming a conformal fluid circulating passage in a part-producing mold, comprising:
    creating a series of open channels in a molding surface of a mold of interest, the depth of said channels substantially conforming to the contour of said molding surface;
    placing a bridging weld within each channel, said bridging weld spanning and sealing each channel and located in each channel at some distance from a bottom of each channel so as to form an enclosed passage at the bottom thereof;
    subsequently filling a remaining volume of each channel above said bridging weld to close each channel; and
    shaping a filled portion of each channel to conform to said molding surface surrounding that channel.

17. The method of claim 16, wherein said conformal fluid circulating passage is formed in a plastic injection mold.

18. The method of claim 16, further comprising providing an inlet and an outlet to said conformal fluid circulating passage, said inlet and outlet accessible from an exterior of a mold for connection to a source of circulating fluid.

19. The method of claim 16, wherein said conformal fluid circulating passage is a cooling passage for circulating cooling fluid.

20. The method of claim 16, wherein said remaining volume of each channel above said bridging weld is filled by welding.

21. A method for forming a conformal cooling passage in a part-producing mold, said conformal cooling passage having an inlet and an outlet, said method comprising:
    creating a series of interconnected open channels in a molding surface of a mold of interest, said channels substantially conforming to the contour of said molding surface;
    placing a bridging weld within each channel, said bridging weld comprising a series of connected weld beads, said bridging weld spanning and sealing each channel and located in each channel at some distance from a bottom of each channel so as to form an enclosed cooling passage at the bottom thereof;
    subsequently filling a remaining volume of each channel above said bridging weld by welding to close each channel; and
    shaping a weld-filled portion of each channel to conform to said molding surface surrounding that channel.

22. The method of claim 21, wherein said conformal cooling passage is formed in a plastic injection mold.

23. The method of claim 21, wherein said inlet and outlet are accessible from an exterior of a mold for connection to a source of circulating fluid.

24. A part-producing mold having improved cooling capabilities, comprising:
    at least one conformal cooling passage located subjacent to a molding surface to be cooled, said at least one conformal cooling passage formed from:
        a series of interconnected open channels placed in a molding surface of said mold, said channels substantially conforming to the contour of said molding surface,
        a bridging weld located within each channel, said bridging weld comprising a series of connected weld beads, said bridging weld spanning and sealing each channel and located in each channel at some distance from a bottom of each channel so as to form an enclosed cooling passage at the bottom thereof, and
        a plurality of weld beads that solidly fill a remaining volume of each channel above said bridging weld to close each channel, said weld beads located along an open top of each channel and shaped to conform to said molding surface of said mold surrounding that channel;
    an inlet associated with said at least one conformal cooling passage for receiving pressurized cooling fluid from a source thereof; and
    an outlet associated with said at least one conformal cooling passage for expelling cooling fluid to a heat removal device after said cooling fluid has passed through said at least one conformal cooling passage.

25. The mold of claim 24, wherein said mold is a plastic injection mold.

26. The mold of claim 24, wherein said inlet and outlet of said at least one conformal cooling passage are accessible from an exterior of said mold.

27. The method of claim 16, wherein at least one of said channels is located subjacent to the molding surface.

28. A method of providing a mold with a conformal cooling passage, comprising:
    creating a mold cavity generally corresponding to a molded part shape using a computer based cooling design;
    cutting a conformal cooling slot in a mold cavity using a computer-based cooling design;
    welding shut the conformal cooling slot using the computer-based cooling design to provide a conformal cooling passage at the bottom thereof, including laying weld beads and building up weld beads, on top of one another, inside the conformal cooling slot to weld shut the conformal cooling slot;
    after the conformal cooling slot is welded shut, building up weld beads on top of one another until weld beads are proud of an adjacent surface of the mold cavity; and
    machining a surface over the conformal cooling passage corresponding to a mold part shape using the computer-based cooling design.

29. The method of claim 28, wherein said conformal cooling passage is formed in a plastic injection mold.

30. The method of claim 28, further comprising providing an inlet and an outlet to said conformal cooling passage, said inlet and outlet accessible from an exterior of a mold for connection to a source of circulating fluid.

31. The method of claim 28, wherein said conformal cooling passage is a cooling passage for circulating cooling fluid.

32. The method of claim 28, wherein said remaining volume of the conformal cooling slot above a bridging weld of weld beads is filled by weld beads.

33. The method of claim 28, wherein at least one of said channels is located subjacent to the molding surface.

34. A method of providing a mold with a conformal cooling passage comprising:
    providing a mold cavity generally corresponding to a molded part shape;
    cutting a conformal cooling slot in the mold cavity;
    welding shut the conformal cooling slot using a computer-based cooling design to provide a conformal cooling passage, including laying weld beads, and building up weld beads, on top of one another, inside the conformal cooling slot to weld shut the conformal cooling slot;
    after the conformal cooling slot is welded shut, building up weld beads on top of one another until weld beads are proud of an adjacent surface of the mold cavity; and
    machining a surface over the conformal cooling passage corresponding to a mold part shape.

35. The method of claim 34, wherein said conformal cooling passage is formed in a plastic injection mold.

36. The method of claim 34, wherein said conformal cooling passage has an inlet and an outlet, said inlet and outlet accessible from an exterior of a mold for connection to a source of circulating fluid.

37. A mold with a conformal cooling passage, comprising:
    a mold cavity generally corresponding to a molded part shape;
    a conformal cooling slot in the mold cavity:
        a conformal cooling slot welded shut using a computer-based cooling design to provide a conformal cooling passage, including a buildup of weld beads, on top of one another, inside the conformal cooling slot to weld shut the conformal cooling slot;
    the weld beads proud of an adjacent surface of the mold and solidly filling a remaining volume of the slot above a bridging weld to close each channel; and
    a machined surface over the conformal cooling passage corresponding to a mold part shape.

38. The mold of claim 37, wherein said mold is a plastic injection mold.

39. The mold of claim 37, further comprising an inlet associated with said at least one conformal cooling passage for receiving pressurized cooling fluid from a source thereof, and an outlet associated with said at least one conformal cooling passage for expelling cooling fluid to a heat removal device after said cooling fluid has passed through said at least one conformal cooling passage.

40. The mold of claim 39, wherein said inlet and outlet of said at least one conformal cooling passage are accessible from an exterior of said mold.

\* \* \* \* \*